US012330278B2

(12) United States Patent
Yang et al.

(10) Patent No.: US 12,330,278 B2
(45) Date of Patent: Jun. 17, 2025

(54) FASTENING TOOL

(71) Applicant: Nanjing Chervon Industry Co., Ltd., Nanjing (CN)

(72) Inventors: Junyong Yang, Nanjing (CN); Jingdong Hao, Nanjing (CN); Mingqi Zhou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 31 days.

(21) Appl. No.: 18/434,143

(22) Filed: Feb. 6, 2024

(65) Prior Publication Data

US 2024/0335929 A1 Oct. 10, 2024

(30) Foreign Application Priority Data

Apr. 4, 2023 (CN) ........................ 202310354191.0

(51) Int. Cl.
*B25C 1/06* (2006.01)
*B25C 1/00* (2006.01)

(52) U.S. Cl.
CPC ................ *B25C 1/008* (2013.01); *B25C 1/06* (2013.01); *B25C 1/001* (2013.01)

(58) Field of Classification Search
CPC ........................................................ B25C 1/06
USPC ............................................ 227/131, 130, 8
See application file for complete search history.

(56) References Cited

U.S. PATENT DOCUMENTS

| | | | | |
|---|---|---|---|---|
| 4,724,992 | A * | 2/1988 | Ohmori | B25C 5/1672 227/132 |
| 5,597,106 | A * | 1/1997 | Hamano | B25C 1/008 227/8 |
| 6,971,567 | B1 * | 12/2005 | Cannaliato | B25C 1/06 173/205 |
| 9,539,714 | B1 * | 1/2017 | Pedicini | B25C 1/06 |
| 9,962,821 | B2 * | 5/2018 | Pedicini | B25C 1/06 |
| 10,569,403 | B2 * | 2/2020 | Namouz | B25C 1/045 |
| 10,786,891 | B2 * | 9/2020 | Noguchi | B25C 1/041 |
| 11,511,406 | B2 * | 11/2022 | Yang | B25C 1/001 |
| 11,654,538 | B2 * | 5/2023 | Knight | B25C 1/047 227/130 |
| 11,850,715 | B2 * | 12/2023 | Wolf | B25C 1/06 |
| 12,122,028 | B2 * | 10/2024 | Miller | B25C 1/06 |

(Continued)

FOREIGN PATENT DOCUMENTS

| | | | | |
|---|---|---|---|---|
| AU | 2014100230 A4 | | 4/2014 | |
| CA | 3211577 A1 | * | 3/2024 | B25C 1/005 |

*Primary Examiner* — Praachi M Pathak
(74) *Attorney, Agent, or Firm* — Greenberg Traurig, LLP

(57) ABSTRACT

A fastening tool includes a housing, a magazine, a striking assembly, a trigger assembly, and a brake assembly, where the housing is formed with an accommodation space, the magazine accommodates a fastener, and the striking assembly is accommodated in the accommodation space and includes a striker, where the striker is configured to move along a striking direction to output a striking force to the fastener; the trigger assembly is configured to trigger a first switch and includes a first state for not triggering the first switch, and when the first switch is not triggered, the striker does not output the striking force; the brake assembly includes a lock state for preventing the striker from moving along the striking direction; and in response to the trigger assembly switching to the first state, the brake assembly switches to the lock state.

20 Claims, 11 Drawing Sheets

(56) References Cited

U.S. PATENT DOCUMENTS

| | | | | |
|---|---|---|---|---|
| 2006/0180631 | A1* | 8/2006 | Pedicini | B25C 1/06<br>227/8 |
| 2008/0121404 | A1* | 5/2008 | Spasov | B25C 1/06<br>173/202 |
| 2013/0161373 | A1* | 6/2013 | Schiestl | B25C 1/06<br>227/146 |
| 2015/0158160 | A1* | 6/2015 | Kato | B25C 1/06<br>91/55 |
| 2016/0288305 | A1* | 10/2016 | McCardle | B25C 1/06 |
| 2017/0209995 | A1* | 7/2017 | Iijima | B25C 1/043 |
| 2017/0217004 | A1* | 8/2017 | Kato | B25C 5/15 |
| 2017/0274513 | A1* | 9/2017 | Pedicini | B25C 1/003 |
| 2020/0130156 | A1* | 4/2020 | Takeuchi | B25F 5/008 |

* cited by examiner

FASTENING TOOL

RELATED APPLICATION INFORMATION

This application claims the benefit under 35 U.S.C. § 119 (a) of Chinese Patent Application No. CN 202310354191.0, filed on Apr. 4, 2023, which application is incorporated herein by reference in its entirety.

TECHNICAL FIELD

The present application relates to the field of power tools and, in particular, to a fastening tool.

BACKGROUND

A fastening tool in the related art is usually used for fixing a workpiece. A user shoots a fastener into the workpiece to fix the workpiece. A striker of the fastening tool is used for striking the fastener. The striker is provided with a rack, and a drive electric motor is connected to a gear. The drive electric motor drives the gear to rotate. Since the rack and the gear mesh with each other, the rack is driven to move during the rotation of the gear so that the striker moves. The gear has a toothless notch. When the gear rotates to a state for the notch to mate with the striker, a power spring or air pressure pushes out the striker to strike a nail. When an edge position of the notch of the gear exactly abuts against a tooth of the rack of the striker, the tooth is easily disengaged when a nail gun vibrates or is subjected to a collision, resulting in an accidental strike of the striker. If a magazine has a fastener, the fastener will be shot out.

This part provides background information related to the present application, which is not necessarily the existing art.

SUMMARY

A fastening tool includes: a housing formed with an accommodation space; a magazine for accommodating a fastener; and a striking assembly accommodated in the accommodation space and including a striker, where the striker is configured to move along a striking direction to output a striking force to the fastener.

The fastening tool further includes: a trigger assembly configured to trigger a first switch, where the trigger assembly includes a first state for not triggering the first switch, and when the first switch is not triggered, the striker does not output the striking force; and a brake assembly including a lock state for preventing the striker from moving along the striking direction.

In response to the trigger assembly switching to the first state, the brake assembly switches to the lock state.

In some examples, the trigger assembly includes a second state for triggering the first switch, the brake assembly includes a release state for allowing the striker to move along the striking direction, and when the trigger assembly switches to the second state, the brake assembly switches to the release state.

In some examples, the trigger assembly is linked to the brake assembly.

In some examples, the brake assembly includes a pawl, where the pawl is rotatably connected to the housing, the pawl is capable of rotating between a lock position and a release position, and the pawl at the lock position is capable of being engaged with a power tooth of the striker.

In some examples, the trigger assembly includes a trigger rod, where the trigger rod is slidably connected to the housing, the trigger rod is capable of moving between a first position and a second position to drive the pawl to rotate, and the trigger rod at the first position does not trigger the first switch.

In some examples, the brake assembly further includes a push rod, where the push rod is slidably connected to the housing, and the trigger rod is capable of moving to drive the push rod to move.

In some examples, a guide post is provided on the pawl, a guide ramp is provided at an end of the push rod, the push rod is capable of moving to drive the guide ramp to abut against the guide post so that the guide post moves along the guide ramp, and the guide post moves to drive the pawl to rotate.

In some examples, the push rod is provided with a limiting slot, and the guide post is capable of moving along the guide ramp into the limiting slot.

In some examples, the trigger rod is configured to move along a first straight line, and the push rod is configured to move substantially parallel to the first straight line.

In some examples, the brake assembly further includes an elastic booster configured to apply, during movement of the pawl, an elastic force to the pawl to move the pawl away from the lock position.

In some examples, the brake assembly further includes an elastic brake member disposed between the pawl and the housing and configured to provide the pawl with an elastic force for biasing the pawl to the lock position.

In some examples, the trigger assembly further includes an elastic trigger member disposed between the trigger rod and the housing and capable of driving the trigger rod to reset to the first position.

In some examples, the first switch includes a magnet and a Hall element, where one of the magnet and the Hall element is disposed on the trigger rod and the other of the magnet and the Hall element is disposed on the housing, and the trigger rod moves so that the Hall element generates a sensing signal.

In some examples, the trigger assembly is linked to the brake assembly through a mechanical structure.

In some examples, the trigger assembly drives the brake assembly to rotate so that the brake assembly switches to the lock state.

A fastening tool includes: a housing formed with an accommodation space; a magazine for accommodating a fastener; and a striking assembly accommodated in the accommodation space and including a striker, where the striker is configured to move along a striking direction to output a striking force to the fastener. The fastening tool further includes: a trigger assembly configured to trigger a first switch, where the trigger assembly includes a first state for not triggering the first switch and a second state for triggering the first switch, and when the first switch is not triggered, the striker does not output the striking force; and a brake assembly including a lock state for preventing the striker from moving along the striking direction and a release state for allowing the striker to move along the striking direction. The trigger assembly drives the brake assembly to move.

A fastening tool includes: a housing formed with an accommodation space; a magazine for accommodating a fastener; and a striking assembly accommodated in the accommodation space and including a striker, where the striker is configured to move along a striking direction to output a striking force to the fastener. The fastening tool further includes: a trigger assembly configured to trigger a first switch, where the trigger assembly includes a first state for not triggering the first switch and a second state for triggering the first switch; and a brake assembly including a lock state for preventing the striker from moving along the striking direction and a release state for allowing the striker to move along the striking direction. In response to the trigger assembly switching to the first state, the brake assembly switches to the lock state, and in response to the trigger assembly switching to the second state, the brake assembly switches to the release state.

In some examples, the trigger assembly is mechanically linked to the brake assembly.

In some examples, the brake assembly includes a pawl, where the pawl is rotatably connected to the housing, the pawl is capable of rotating between a lock position and a release position, and the pawl at the lock position is capable of being engaged with a power tooth of the striker.

In some examples, the trigger assembly includes a trigger rod, where the trigger rod is slidably connected to the housing, the trigger rod is capable of moving between a first position and a second position to drive the pawl to rotate, and the trigger rod at the first position does not trigger the first switch.

DETAILED DESCRIPTION

Figure 1:
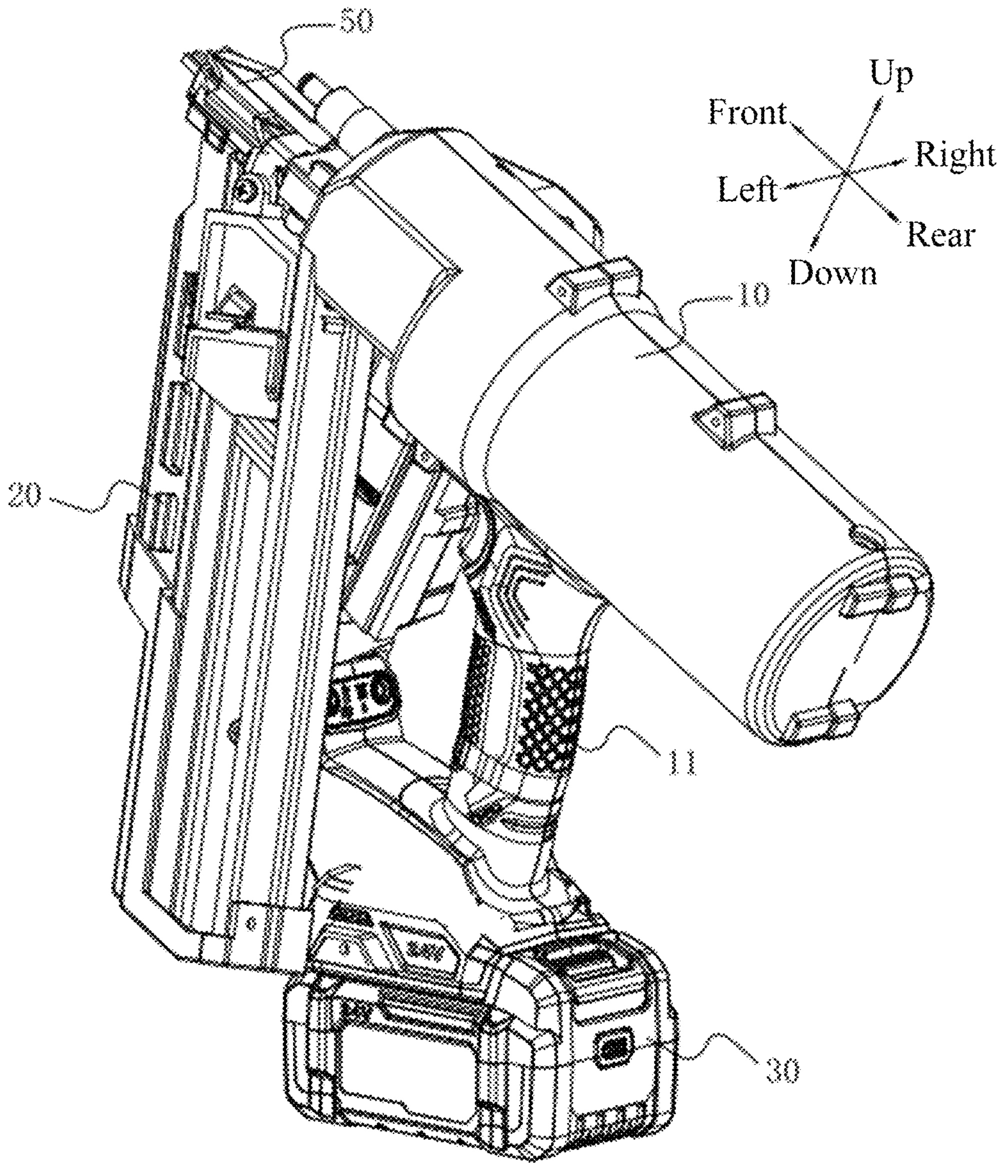
FIG. 1 is a structural view of a fastening tool according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Referring to FIGS. 1 to 14, this example provides a fastening tool that can apply a striking force to a fastener to shoot the fastener into a workpiece. The fastening tool includes a housing 10 and a magazine 20. The housing 10 is formed with an accommodation space, and the magazine 20 is used for accommodating the fastener. The magazine 20 is disposed on an outer side of the housing 10. According to directions indicated by arrows in FIGS. 1 and 2, the magazine 20 is disposed at a front end of the housing 10. The fastening tool provided in this example is a nail gun, and the fastener is a nail. The housing 10 is further formed with a handle portion 11 that can be held by a user. A main switch is provided on the handle portion 11, and the user controls the start and stop of the fastening tool through the main switch. A power interface is connected to an end of the handle portion 11 and used for connecting a direct current or alternating current power supply. In this example, the power interface is connected to a battery pack 30.

Figure 2:
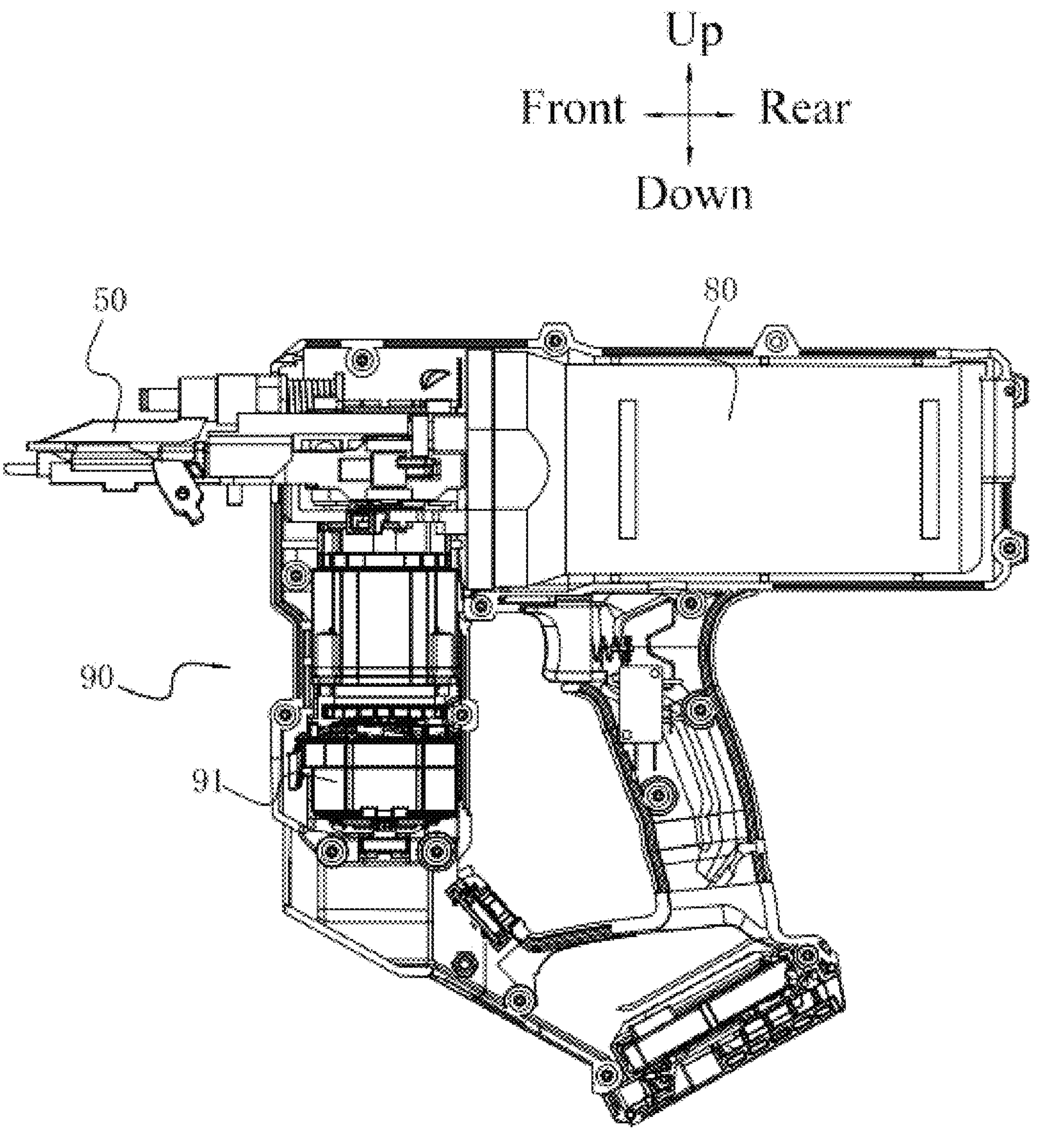
FIG. 2 is a sectional view of the fastening tool of FIG. 1.
Figure 3:
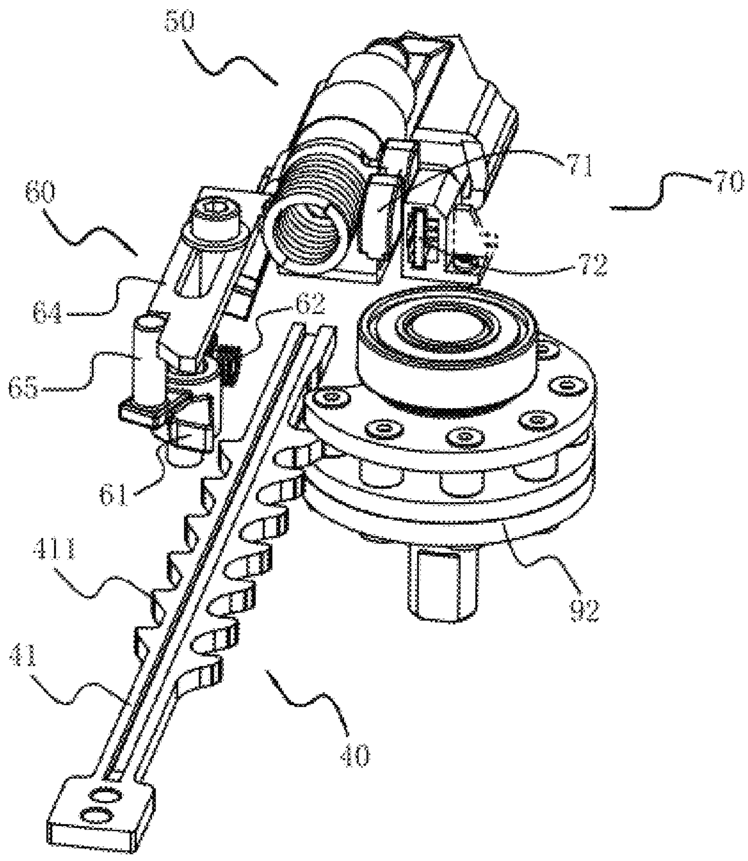
FIG. 3 is a structural view one in which a pawl of the fastening tool of FIG. 1 is at a release position.

As shown in FIGS. 1 to 3, the fastening tool further includes a striking assembly 40, a trigger assembly 50, and a brake assembly 60. The striking assembly 40 and the brake assembly 60 are disposed in the accommodation space, and the trigger assembly 50 is disposed at the front end of the housing 10 and is partially disposed in the accommodation space. The striking assembly 40 includes a striker 41, and the striker 41 is configured to move along a striking direction to output the striking force to the fastener, where the striking direction is a direction in which the fastener is spiked into the workpiece. According to the directions indicated by the arrows in FIGS. 1 and 2, the striking direction is a forward direction.

The trigger assembly 50 is configured to trigger a first switch 70, and the trigger assembly 50 includes a first state for not triggering the first switch 70 and a second state for triggering the first switch 70. When the first switch 70 is not triggered, the striker 41 does not output the striking force. The brake assembly 60 includes a lock state for preventing the striker 41 from moving along the striking direction and a release state for allowing the striker 41 to move along the striking direction. In response to the trigger assembly 50 switching to the first state, the brake assembly 60 switches to the lock state. It is to be noted that the brake assembly 60 in response to the trigger assembly 50 refers to that the trigger assembly 50 is mechanically connected to the brake assembly 60, and when the trigger assembly 50 starts to switch to the first state, the brake assembly 60 starts to switch to the lock state. When the trigger assembly 50 switches to the second state, the brake assembly 60 switches to the release state.

When the trigger assembly 50 is in the first state, the first switch 70 is not triggered, and the striker 41 does not output the striking force. The brake assembly 60 is in the lock state to prevent the striker 41 from moving along the striking direction so that the striker 41 will not accidentally move along the striking direction. In the following description, to simplify the description, that the striker 41 accidentally moves along the striking direction is replaced with the falling of the striker 41. The brake assembly 60 avoids an accidental strike of the striker 41, achieving higher stability and safety.

The fastening tool further includes a power output portion 80, where the power output portion 80 is disposed in the accommodation space and configured to output power to the striker 41. In this example, the power output portion 80 includes a cylinder and does work through gas in the cylinder to push the striker 41 to move and strike the nail. The cylinder further includes an inflation nozzle for inflating gas into the cylinder in advance. When the striker 41 is released, the striker 41 has an acceleration under the action of pressure of the gas inflated in advance so that the striker 41 strikes the nail with a relatively large momentum.

Figure 4:
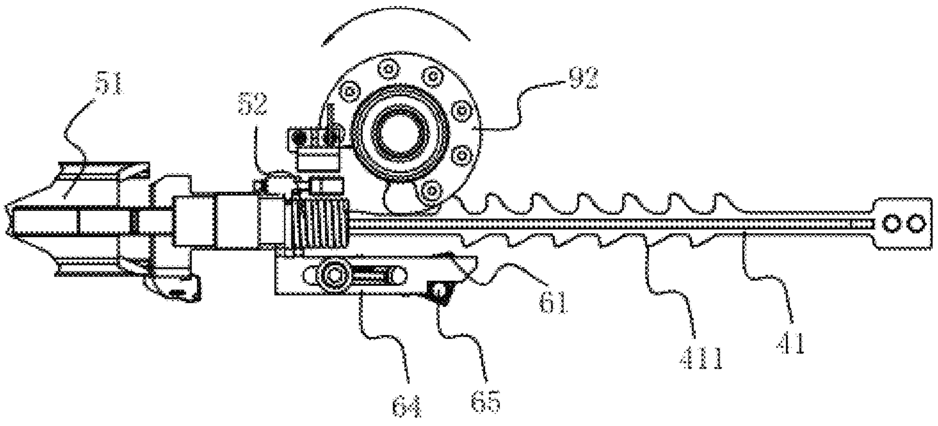
FIG. 4 is a top view of FIG. 3.

The fastening tool further includes a drive mechanism 90, and the drive mechanism 90 can drive the striker 41 to move along an opposite direction of the striking direction. In this example, the drive mechanism 90 includes an electric motor 91 and a gear 92, where the electric motor 91 can drive the gear 92 to rotate. The striker 41 is provided with multiple power teeth 411, and the gear 92 meshes with a power tooth 411. The gear 92 has a toothless notch. After the first switch 70 is triggered, the electric motor 91 drives the gear 92 to rotate to a position for the notch to mate with the striker 41. Referring to FIG. 4, when the gear 92 rotates and is disengaged from the power tooth 411 of the striker 41, the striker 41 moves along the striking direction under the action of the cylinder to complete one strike. A direction of rotation of the gear 92 is indicated by an arrow in FIG. 4. After the strike is completed, a power tooth 411 at the rearmost end of the striker 41 moves to the vicinity of the gear 92, and the electric motor 91 drives the gear 92 to continue to rotate so that the gear 92 meshes with the striker 41, and the gear 92 rotates to drive the striker 41 to move backward to reset, that is, reset along the opposite direction of the striking direction to prepare for the next strike.

The direction of rotation of the gear 92 is unidirectional. The drive mechanism 90 further includes a one-way clutch for restricting the gear 92 to rotating along only one direction. The one-way clutch is an existing structure, and the details are not repeated here.

The trigger assembly 50 includes a trigger rod 51, where the trigger rod 51 is slidably connected to the housing 10, and the trigger rod 51 is capable of moving between a first position and a second position to switch the trigger assembly 50 between the first state and the second state. Specifically, when the trigger rod 51 is at the first position, the trigger assembly 50 is in the first state; when the trigger rod 51 is at the second position, the trigger assembly 50 is in the second state.

In this example, the trigger rod 51 may be operated by an operator to move between the first position and the second position. Specifically, when the trigger rod 51 is at the first position, the operator abuts the trigger rod 51 against the workpiece so that the trigger rod 51 moves to the second position to trigger the first switch 70.

The trigger assembly 50 further includes an elastic trigger member 52 disposed between the trigger rod 51 and the housing 10 and capable of driving the trigger rod 51 to reset to the first position. When the operator carries the whole machine away from the workpiece, the trigger rod 51 is released from abutting against the workpiece and reset under the action of the elastic trigger member 52.

The first switch 70 may be a microswitch, a relay, or a potentiometer. In this example, the first switch 70 includes a magnet 71 and a Hall element 72, where one of the magnet 71 and the Hall element 72 is disposed on the trigger rod 51 and the other of the magnet 71 and the Hall element 72 is disposed on the housing 10, and the trigger rod 51 moves so that the Hall element 72 generates a sensing signal. Specifically, the magnet 71 is disposed on the trigger rod 51, and the Hall element 72 is disposed on the housing 10. When the trigger rod 51 moves between the first position and the second position, the Hall element 72 senses position changes of the magnet 71 and then outputs different signals so that the first switch 70 is triggered and not triggered.

The brake assembly 60 includes a pawl 61, where the pawl 61 is rotatably connected to the housing 10, the pawl 61 is capable of rotating between a lock position and a release position, the pawl 61 at the lock position is capable of being engaged with the power tooth 411 of the striker 41, and the pawl 61 at the release position is disengaged from the power tooth 411 of the striker 41. The striker 41 is provided with multiple power teeth 411, the multiple power teeth 411 are distributed on two sides of the striker 41, the pawl 61 and the gear 92 are distributed on the two sides of the striker 41, the power tooth 411 on one side can mesh with the gear 92, and the power tooth 411 on the other side can be engaged with the pawl 61. Specifically, a limiting protrusion 611 is provided at an end of the pawl 61. When the pawl 61 is at the lock position, the limiting protrusion 611 is located on a movement path of the striker 41. If the striker 41 accidentally falls along the striking direction, the limiting protrusion 611 is engaged with the power tooth 411 of the striker 41 to limit the accidental strike of the striker 41.

Figure 7:
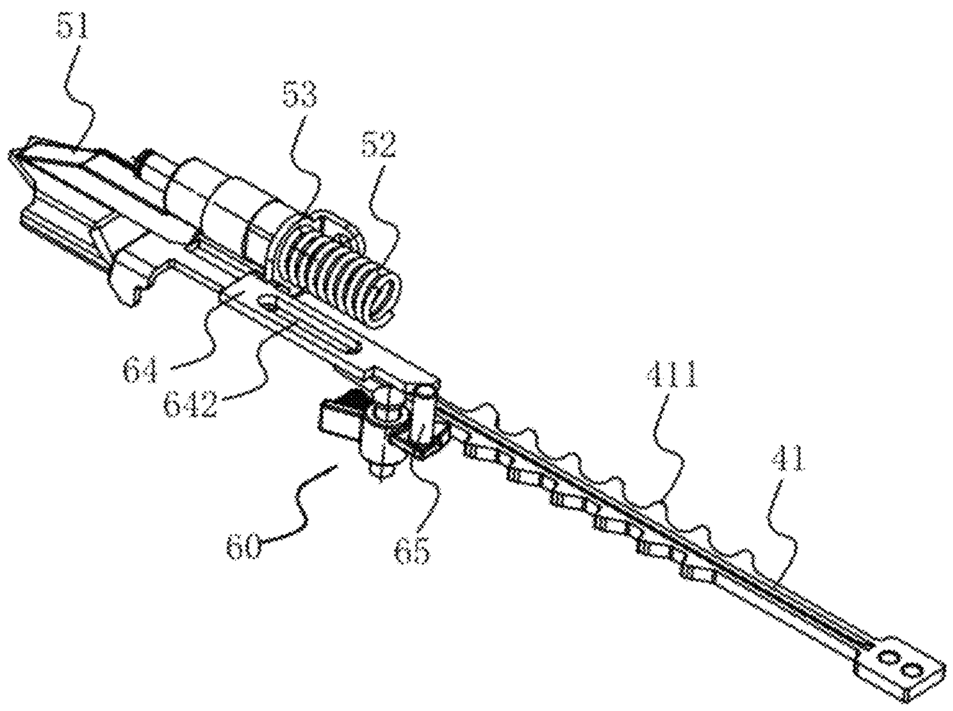
FIG. 7 is a partial structural view of FIG. 6.
Figure 8:
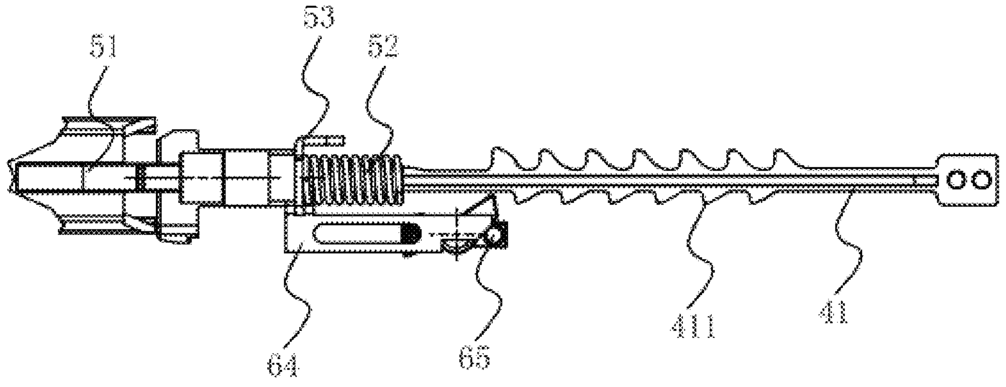
FIG. 8 is a top view of FIG. 7.
Figure 9:
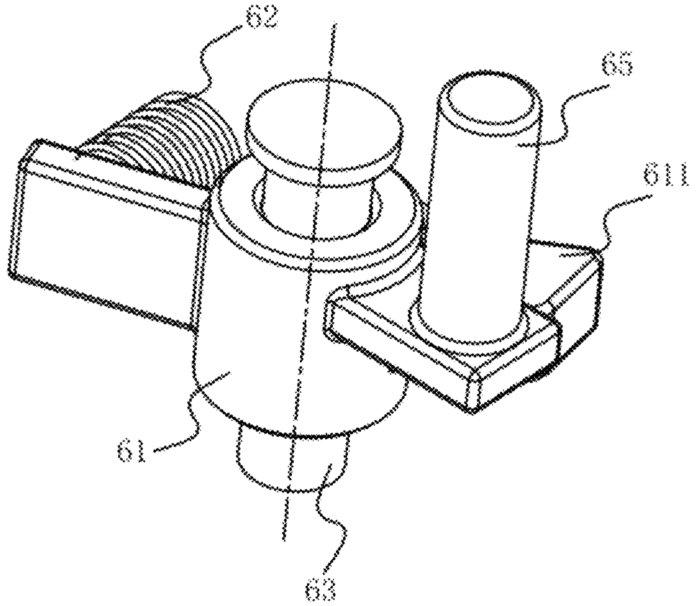
FIG. 9 is a structural view of a brake assembly of the fastening tool of FIG. 1.
Figure 10:
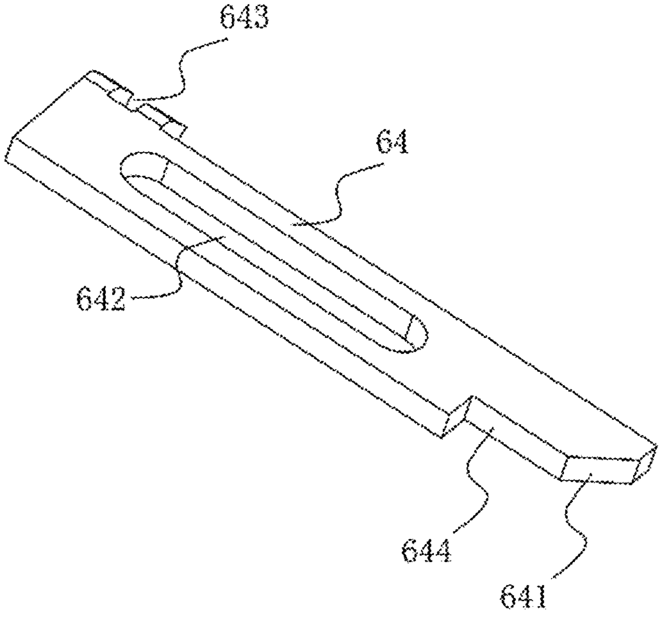
FIG. 10 is a structural view of a push rod of the fastening tool of FIG. 1.
Figure 11:
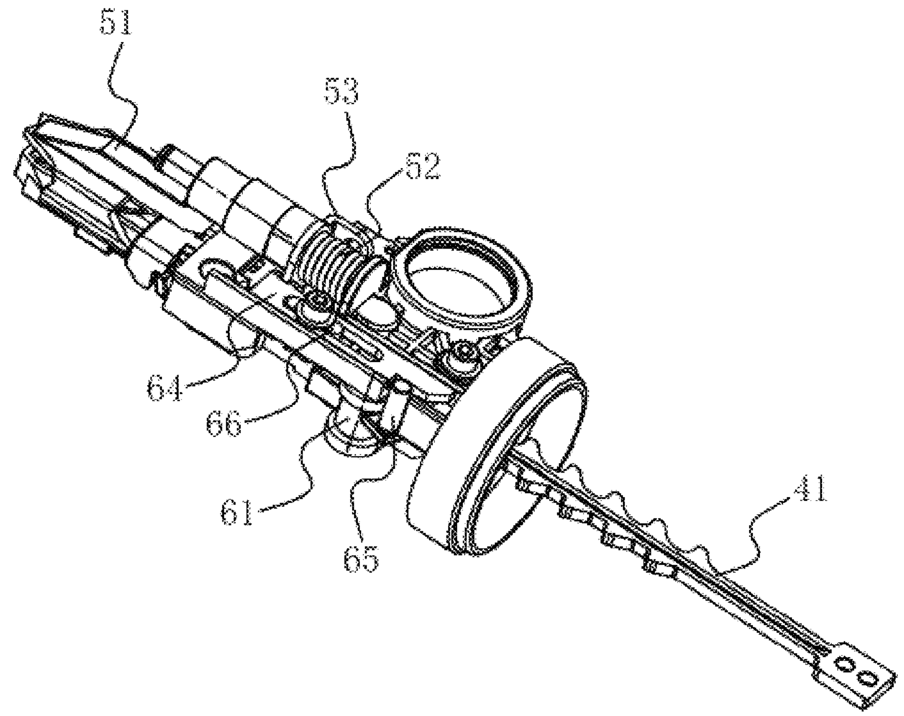
FIG. 11 is a structural view two in which a pawl of the fastening tool of FIG. 1 is at a release position.
Figure 12:
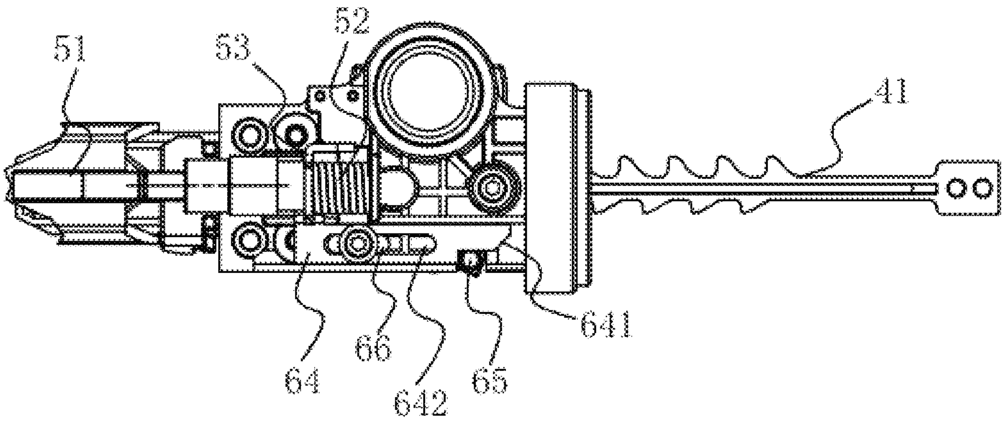
FIG. 12 is a top view of FIG. 11.
Figure 13:
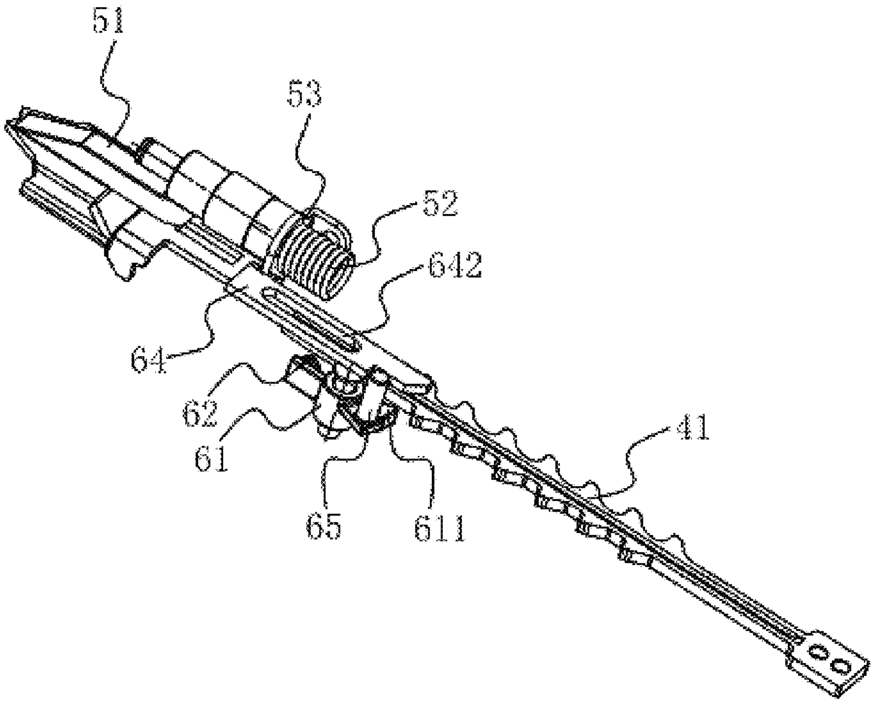
FIG. 13 is a partial structural view of FIG. 11.
Figure 14:
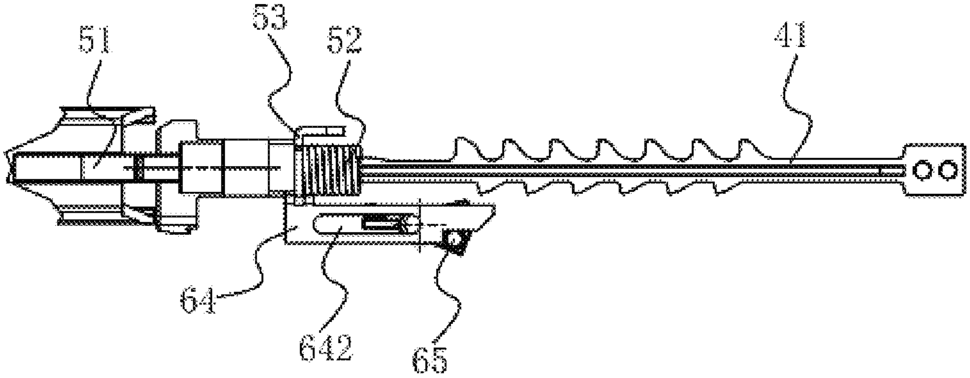
FIG. 14 is a top view of FIG. 13.

Referring to FIG. 7, when the pawl 61 is at the lock position, the limiting protrusion 611 is spaced apart from a power tooth 411 at the foremost end of the striker 41. Only when the striker 41 accidentally falls along the striking direction, can the limiting protrusion 611 be engaged with the power tooth 411 of the striker 41, and the space therebetween facilitates the rotation of the pawl 61.

In this example, the trigger assembly 50 is linked to the brake assembly 60. Specifically, the trigger assembly 50 drives the brake assembly 60 to move. When switching from the first state to the second state, the trigger assembly 50 drives the brake assembly 60 to switch from the lock state to the release state, so as to ensure synchronization between the trigger assembly 50 and the brake assembly 60 and avoid a delay, so that the striker 41 moves quickly and smoothly.

Figure 5:
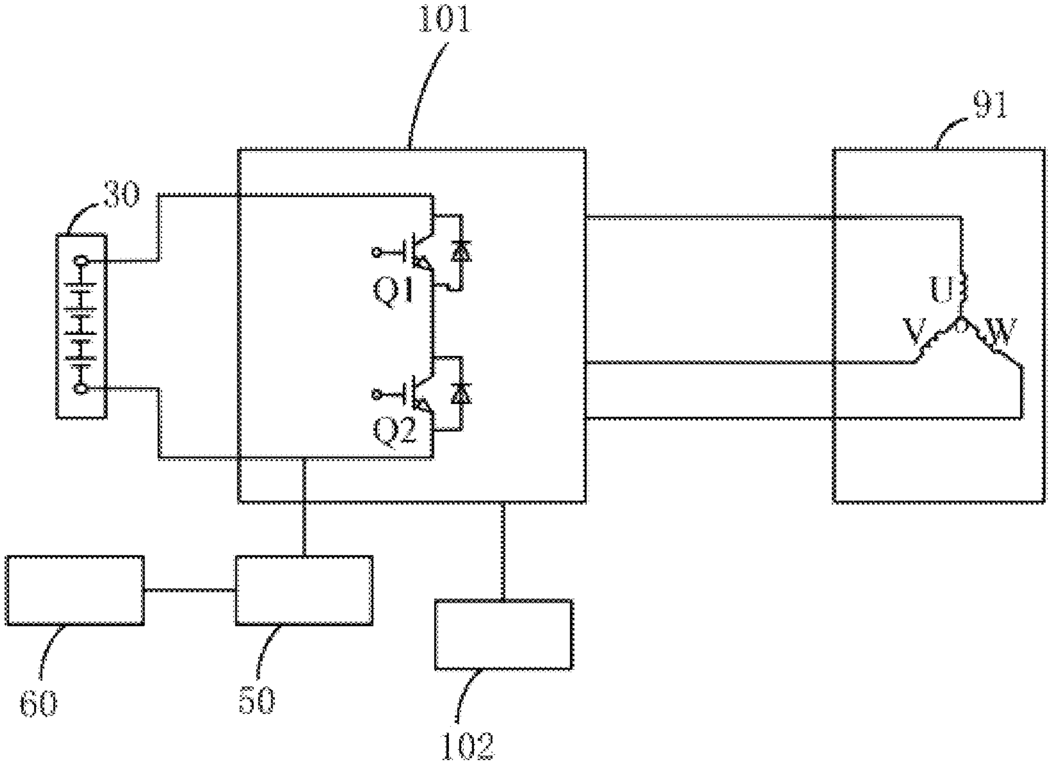
FIG. 5 is a circuit diagram of the fastening tool of FIG. 1.
Figure 6:
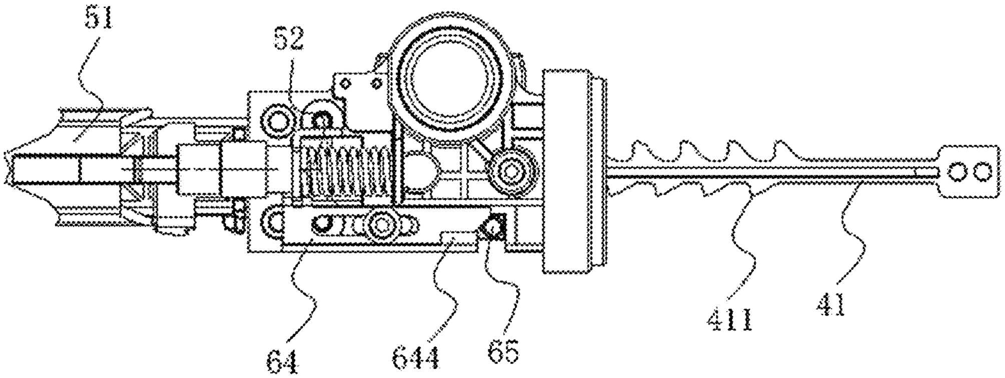
FIG. 6 is a top view in which a pawl of the fastening tool of FIG. 1 is at a lock position.

Referring to FIGS. 3 to 5, the fastening tool includes a driver circuit 101, the battery pack 30 can supply power to the driver circuit 101, both the first switch 70 and the electric motor 91 are electrically connected to the driver circuit 101, and the driver circuit 101 is electrically connected to a controller 102. The trigger rod 51 of the trigger assembly 50 mechanically moves to trigger the first switch 70 so that the trigger assembly 50 does not need to be powered; and the trigger assembly 50 drives the brake assembly 60 to move so that the brake assembly 60 does not need to be powered, thereby implementing pure mechanical backstopping, a stable structure, and non-limitation by power interruption. In this manner, when the fastening tool stops, even if the fastening tool is vibrated and the power tooth 411 has a trend to be disengaged from the gear 92, the brake assembly 60 can prevent this trend, thereby ensuring that the striker 41 will not accidentally fall and improving safety.

Specifically, the trigger rod 51 drives, during its movement, the pawl 61 to rotate. When moving from the first position to the second position, the trigger rod 51 drives the pawl 61 to rotate from the lock position to the release position. The trigger rod 51 at the first position does not trigger the first switch 70, and the striker 41 does not output the striking force. In this case, the pawl 61 is at the lock position, and the brake assembly 60 is in the lock state to prevent the striker 41 from moving along the striking direction so that the striker 41 will not accidentally fall. When moving from the first position to the second position, the trigger rod 51 triggers the first switch 70 and drives the pawl 61 to rotate from the lock position to the release position so that the brake assembly 60 is in the release state to allow the striker 41 to move along the striking direction.

The brake assembly 60 further includes an elastic brake member 62 disposed between the pawl 61 and the housing 10 and configured to provide the pawl 61 with an elastic force for biasing the pawl 61 to the lock position. When the pawl 61 is at the lock position, the limiting protrusion 611 on the pawl 61 abuts against the striker 41. In this case, the elastic brake member 62 provides the pawl 61 with the elastic force for biasing the pawl 61 to the lock position so that the pawl 61 is stable in position and can readily prevent the movement of the striker 41 in time.

Specifically, the limiting protrusion 611 is disposed at an end of the pawl 61, the elastic brake member 62 is disposed at the other end of the pawl 61, a spindle 63 where the pawl 61 is located is disposed between the limiting protrusion 611 and the elastic brake member 62, and the pawl 61 is rotatably connected to the spindle 63. When the pawl 61 is at the lock position, the limiting protrusion 611 abuts against the striker 41, and the elastic brake member 62 is compressed to provide the pawl 61 with the elastic force for biasing the pawl 61 to the lock position.

In this example, the brake assembly 60 further includes a push rod 64, where the push rod 64 is slidably connected to the housing 10, and the trigger rod 51 is capable of moving to drive the push rod 64 to move. The push rod 64 can push the pawl 61 to rotate. Specifically, a guide post 65 is provided on the pawl 61, a guide ramp 641 is provided at an end of the push rod 64, the push rod 64 is capable of moving to drive the guide ramp 641 to abut against the guide post 65 so that the guide post 65 moves along the guide ramp 641, and the guide post 65 moves to drive the pawl 61 to rotate.

The trigger rod 51 is configured to move along a first straight line, and the push rod 64 is configured to move substantially parallel to the first straight line. Specifically, a trigger piece 53 is provided on the trigger rod 51, the push rod 64 is provided with a groove 643, and the trigger piece 53 is inserted into the groove 643 so that the trigger rod 51 can drive the push rod 64 to move.

The brake assembly 60 further includes a limiting post 66, where the limiting post 66 is fixedly connected to the housing 10. The push rod 64 is provided with a guide slot 642, and the limiting post 66 penetrates through the guide slot 642. During the movement of the push rod 64, the limiting post 66 slides within the guide slot 642. The guide slot 642 is an elongated slot, and the limiting post 66 is elongated so that the push rod 64 can be prevented from rotating, and the push rod 64 moves stably along a straight line.

The guide ramp 641 mates with the guide post 65 so that the pawl 61 rotates about its own axis. The guide ramp 641 may be a planar or curved surface. When the guide ramp 641 is the curved surface, the curved surface may be an arc-shaped surface disposed around the axis of the pawl 61 so that the guide post 65 and the pawl 61 have collinear axes, thereby ensuring that the pawl 61 rotates stably.

The push rod 64 is provided with a limiting slot 644, and the guide post 65 is capable of moving along the guide ramp 641 into the limiting slot 644. When the trigger rod 51 moves from the first position to the second position, the guide post 65 moves along the guide ramp 641 into the limiting slot 644, and the limiting slot 644 limits the guide post 65 so that the pawl 61 is stable at the release position.

In this example, the limiting slot 644 is a notch slot defined on a side of the push rod 64, which is convenient to machine and produce. The guide post 65 can abut against a slot wall of the limiting slot 644. In a process of the pawl 61 rotating from the lock position to the release position, as the guide post 65 moves, the limiting protrusion 611 of the pawl 61 is disengaged from the striker 41. In this case, the elastic brake member 62 is further compressed. Since the limiting slot 644 limits the guide post 65, the limiting protrusion 611 of the pawl 61 is disengaged from the striker 41, and the pawl 61 is stable in position.

The brake assembly 60 further includes an elastic booster configured to apply, during the movement of the pawl 61, an elastic force to the pawl 61 to move the pawl 61 away from the lock position. The push rod 64 can move to drive the guide ramp 641 to abut against the guide post 65 so that the guide post 65 moves along the guide ramp 641, and the guide post 65 moves to drive the pawl 61 to rotate so that the pawl 61 moves away from the striker 41. In this case, the elastic booster applies, during the movement of the pawl 61, the elastic force to the pawl 61 to move the pawl 61 away from the lock position so that the limiting protrusion 611 on the pawl 61 can be quickly disengaged from the striker 41. In particular, after the limiting protrusion 611 of the pawl 61 is engaged with the power tooth 411 of the striker 41 due to the accidental falling of the striker 41, the elastic booster applies, during the movement of the pawl 61, the elastic force to the pawl 61 to move the pawl 61 away from the lock position so that the limiting protrusion 611 on the pawl 61 can be quickly disengaged from the power tooth 411 of the striker 41, avoiding stuttering. Generally, a gap is left between the power tooth 411 and the pawl 61 for the pawl 61 to rotate. After the fastening tool is used for a period of time, the striker 41 and the pawl 61 may be worn. When the pawl 61 is at the lock position, a gap between the power tooth 411 and the pawl 61 which are worn may become smaller or even disappear, and the power tooth 411 may be in direct contact with the pawl 61. If the power tooth 411 is in direct contact with the pawl 61, the pawl 61 has no space for rotation. When the trigger assembly 50 is triggered, the pawl 61 and the power tooth 411 are easily crushed. When the brake assembly 60 further includes the elastic booster, the elastic booster with elasticity may deform to absorb a force of the trigger assembly 50 and act as a buffer to prevent the pawl 61 and the power tooth 411 from being damaged.

In this example, the elastic trigger member 52, the elastic brake member 62, and the elastic booster may each be a spring.

FIGS. 15 to 19 show another example of the present application, where the trigger assembly 50 and the brake assembly 60 are independent of each other, and the brake assembly 60 further includes a solenoid 200 for driving the pawl 61 to rotate, which is simple in structure and fast in response.

Specifically, the solenoid 200 includes a telescopic rod 201, a magnetic field generated by a current through a wire of the solenoid 200 controls the telescopic rod 201 to extend and retract, a connecting rod 202 is provided at an end of the telescopic rod 201, an end of the connecting rod 202 is slidably connected to the telescopic rod 201, the other end of the connecting rod 202 is fixedly connected to the spindle 63 where the pawl 61 is located, and the pawl 61 is fixedly connected to the spindle 63. The telescopic rod 201 extends and retracts along a straight line to drive the connecting rod 202 to rotate, and the connecting rod 202 drives the pawl 61 to rotate. It is to be understood that the connecting rod 202 and the pawl 61 rotate coaxially.

Figure 15:
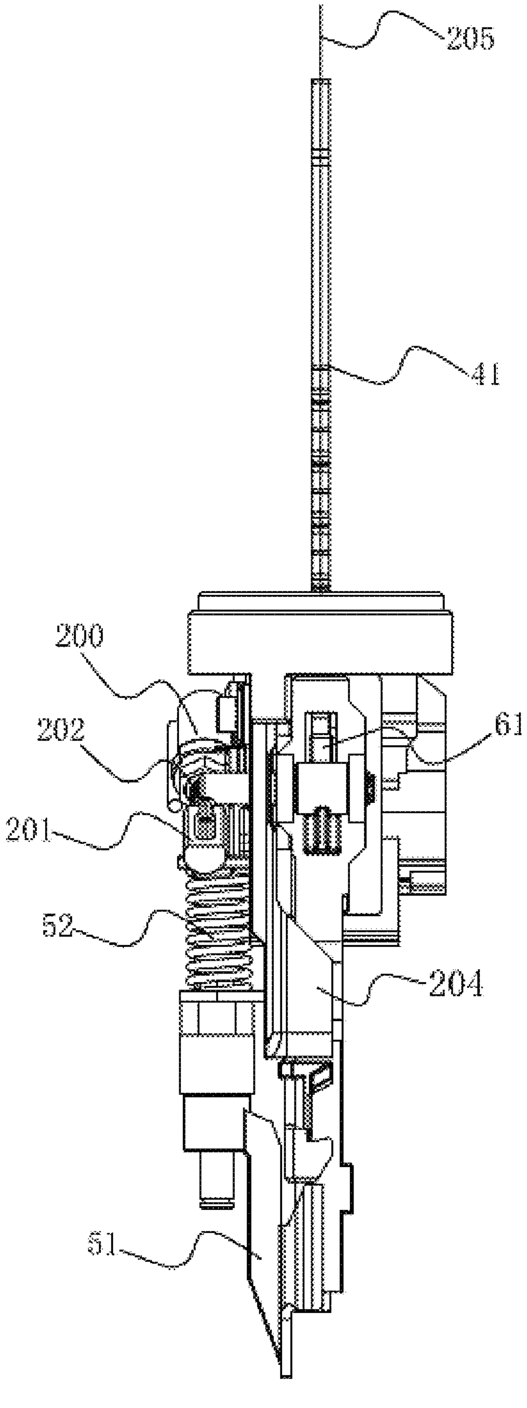
FIG. 15 is a front view of part of the structure of a fastening tool according to another example of the present application.
Figure 16:
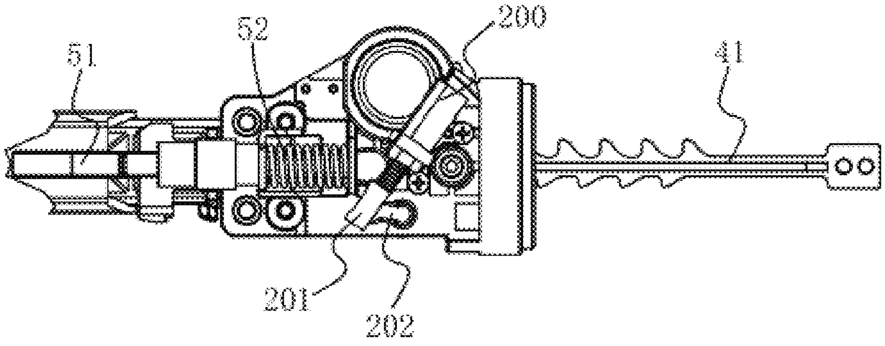
FIG. 16 is a side view of FIG. 15.
Figure 17:
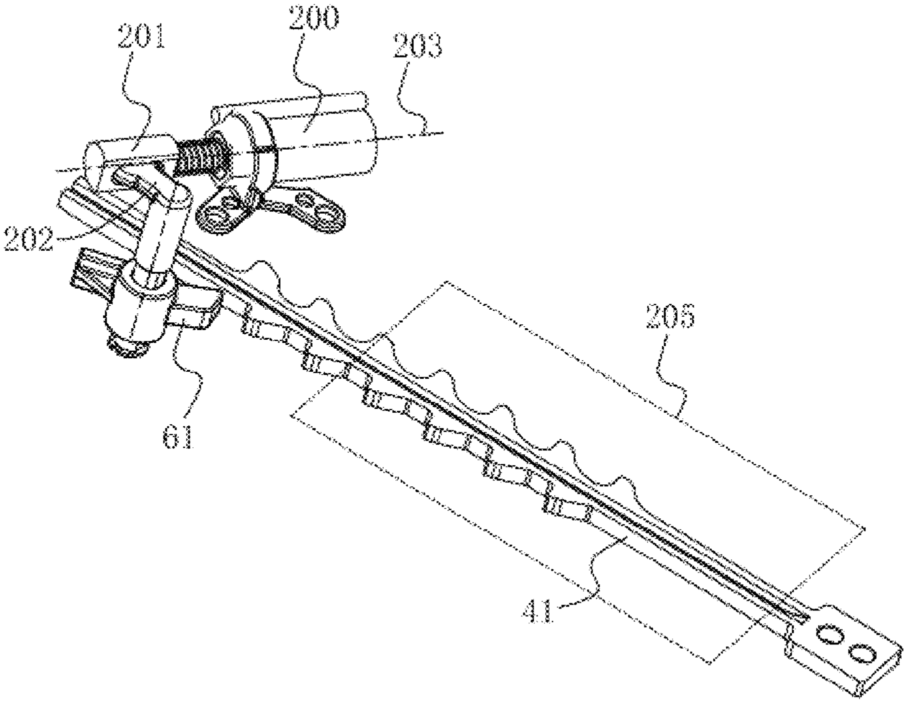
FIG. 17 is a structural view in which a pawl of the fastening tool of FIG. 15 is at a lock position.
Figure 18:
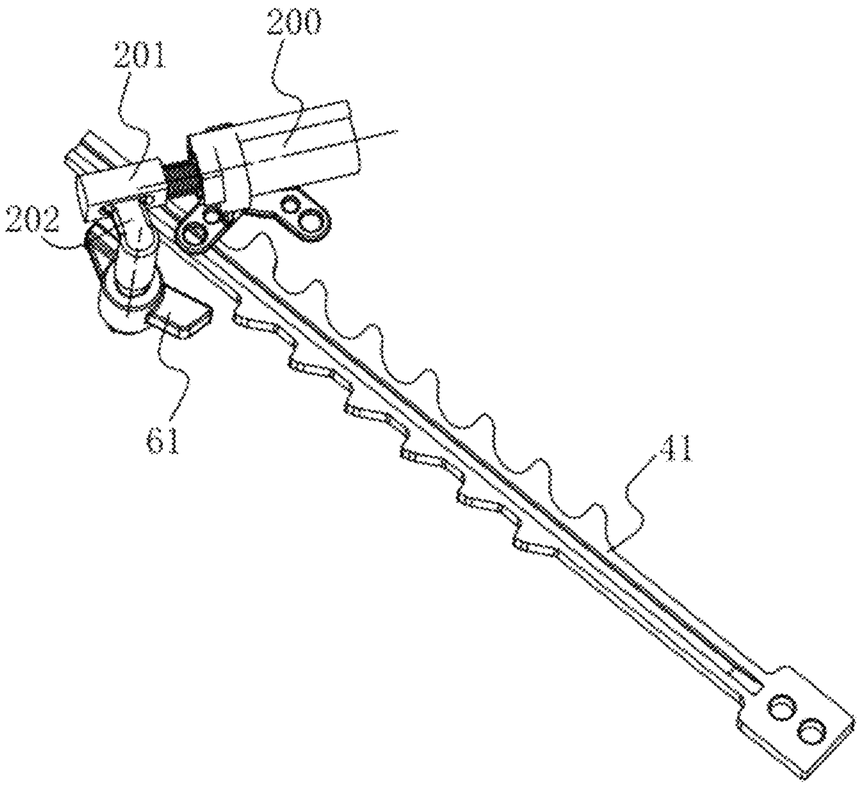
FIG. 18 is a structural view in which a pawl of the fastening tool of FIG. 15 is at a release position.

As shown in FIGS. 15 and 17, the solenoid 200 is substantially disposed along a first axis 203. The telescopic rod 201 moves substantially along a direction of the first axis 203. The striker 41 extends substantially along a first plane 205. The first axis 203 is above the first plane 205. The fastening tool includes a support seat 204 that supports at least part of the solenoid 200. The support seat 204 is fixedly mounted on the housing 10. In this example, the first axis 203 is above the support seat 204, and the first axis 203 is parallel to the striking direction of the striker 41. The first axis 203 is parallel to the first plane 205. In other examples, the first axis 203 is inclined relative to the first plane 205, or the first axis 203 is inclined relative to the striking direction of the striker 41. In some examples, an angle at which the first axis 203 is inclined relative to the first plane 205 is less than or equal to 10°. In some examples, the angle at which the first axis 203 is inclined relative to the first plane 205 is less than or equal to 5°. In some examples, an angle at which the first axis 203 is inclined relative to the striking direction of the striker 41 is less than or equal to 10°. In some examples, the angle at which the first axis 203 is inclined relative to the striking direction of the striker 41 is less than or equal to 5°.

Figure 19:
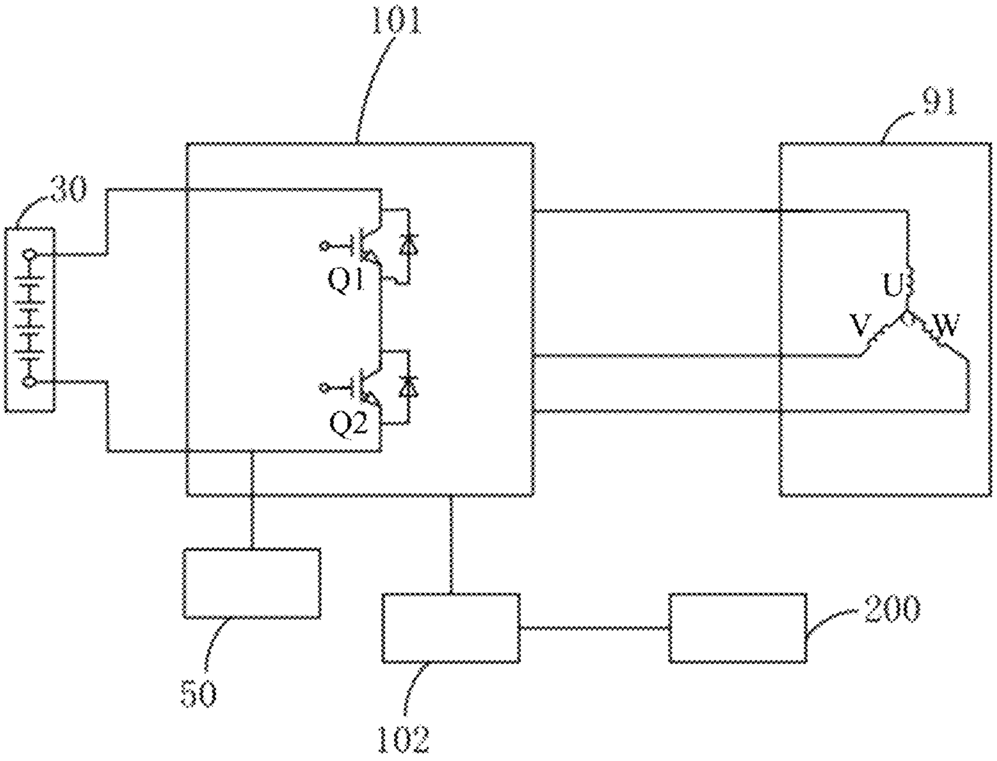
FIG. 19 is a circuit diagram of the fastening tool of FIG. 15.

Referring to FIG. 19, the fastening tool includes the driver circuit 101, the battery pack 30 can supply power to the driver circuit 101, both the first switch 70 and the electric motor 91 are electrically connected to the driver circuit 101, and the driver circuit 101 is electrically connected to the controller 102. The trigger assembly 50 does not need to be powered, but the solenoid 200 drives, through the current, the brake assembly 60 to move. Thus, only when the driver circuit 101 is powered on, can the solenoid 200 drive the brake assembly 60. Specifically, the solenoid 200 is electrically connected to the controller 102. After the fastening tool is safely started, the driver circuit 101 is powered on, and the solenoid 200 is controlled by the controller 102 to drive the brake assembly 60.

The preceding examples illustrate only the basic principles and features of the present application and are not to limit the present application. Various changes and variations can be made to the present application without departing from the spirit and scope of the present application, and such changes and variations are within the scope of the present application. The scope of the present application is defined by the appended claims and their equivalents.

What is claimed is:

1. A fastening tool, comprising:
- a housing formed with an accommodation space;
- a magazine for accommodating a fastener;
- a striking assembly accommodated in the accommodation space and comprising a striker, wherein the striker is configured to move along a striking direction to output a striking force to the fastener;
- a trigger assembly configured to trigger a first switch, wherein the trigger assembly comprises a first state for not triggering the first switch, and, when the first switch is not triggered, the striker does not output the striking force; and a brake assembly comprising a lock state for preventing the striker from moving along the striking direction;

wherein in response to the trigger assembly switching to the first state, the brake assembly switches to the lock state.

2. The fastening tool according to claim 1, wherein the trigger assembly comprises a second state for triggering the first switch, the brake assembly comprises a release state for allowing the striker to move along the striking direction, and when the trigger assembly switches to the second state, the brake assembly switches to the release state.

3. The fastening tool according to claim 1, wherein the trigger assembly is linked to the brake assembly.

4. The fastening tool according to claim 3, wherein the brake assembly comprises a pawl, the pawl is rotatably connected to the housing, the pawl is capable of rotating between a lock position and a release position, and the pawl at the lock position is capable of being engaged with a power tooth of the striker.

5. The fastening tool according to claim 4, wherein the brake assembly further comprises an elastic booster configured to apply, during movement of the pawl, an elastic force to the pawl to move the pawl away from the lock position.

6. The fastening tool according to claim 4, wherein the brake assembly further comprises an elastic brake member disposed between the pawl and the housing and configured to provide the pawl with an elastic force for biasing the pawl to the lock position.

7. The fastening tool according to claim 4, wherein the trigger assembly comprises a trigger rod, the trigger rod is slidably connected to the housing, the trigger rod is capable of moving between a first position and a second position to drive the pawl to rotate, and the trigger rod at the first position does not trigger the first switch.

8. The fastening tool according to claim 7, wherein the trigger assembly further comprises an elastic trigger member disposed between the trigger rod and the housing and capable of driving the trigger rod to reset to the first position.

9. The fastening tool according to claim 7, wherein the first switch comprises a magnet and a Hall element, one of the magnet and the Hall element is disposed on the trigger rod and another of the magnet and the Hall element is disposed on the housing, and the trigger rod moves so that the Hall element generates a sensing signal.

10. The fastening tool according to claim 7, wherein the brake assembly further comprises a push rod, The push rod is slidably connected to the housing, and the trigger rod is capable of moving to drive the push rod to move.

11. The fastening tool according to claim 10, wherein the trigger rod is configured to move along a first straight line, and the push rod is configured to move substantially parallel to the first straight line.

12. The fastening tool according to claim 10, wherein a guide post is provided on the pawl, a guide ramp is provided at an end of the push rod, the push rod is capable of moving to drive the guide ramp to abut against the guide post so that the guide post moves along the guide ramp, and the guide post moves to drive the pawl to rotate.

13. The fastening tool according to claim 12, wherein the push rod is provided with a limiting slot, and the guide post is capable of moving along the guide ramp into the limiting slot.

14. The fastening tool according to claim 1, wherein the trigger assembly is linked to the brake assembly through a mechanical structure.

15. The fastening tool according to claim 1, wherein the trigger assembly drives the brake assembly to rotate so that the brake assembly switches to the lock state.

16. A fastening tool, comprising:

a housing formed with an accommodation space;

a magazine for accommodating a fastener; and a striking assembly accommodated in the accommodation space and comprising a striker, wherein the striker is configured to move along a striking direction to output a striking force to the fastener;

a trigger assembly configured to trigger a first switch, wherein the trigger assembly comprises a first state for not triggering the first switch and a second state for triggering the first switch, and, when the first switch is not triggered, the striker does not output the striking force; and a brake assembly comprising a lock state for preventing the striker from moving along the striking direction and a release state for allowing the striker to move along the striking direction;

wherein the trigger assembly drives the brake assembly to move.

17. A fastening tool, comprising:

a housing formed with an accommodation space;

a magazine for accommodating a fastener; and a striking assembly accommodated in the accommodation space and comprising a striker, wherein the striker is configured to move along a striking direction to output a striking force to the fastener;

a trigger assembly configured to trigger a first switch, wherein the trigger assembly comprises a first state for not triggering the first switch and a second state for triggering the first switch; and a brake assembly comprising a lock state for preventing the striker from moving along the striking direction and a release state for allowing the striker to move along the striking direction;

wherein in response to the trigger assembly switching to the first state, the brake assembly switches to the lock state, and in response to the trigger assembly switching to the second state, the brake assembly switches to the release state.

18. The fastening tool according to claim 17, wherein the trigger assembly is mechanically linked to the brake assembly.

19. The fastening tool according to claim 17, wherein the brake assembly comprises a pawl, the pawl is rotatably connected to the housing, the pawl is capable of rotating between a lock position and a release position, and the pawl at the lock position is capable of being engaged with a power tooth of the striker.

20. The fastening tool according to claim 19, wherein the trigger assembly comprises a trigger rod, the trigger rod is slidably connected to the housing, the trigger rod is capable of moving between a first position and a second position to drive the pawl to rotate, and the trigger rod at the first position does not trigger the first switch.

* * * * *